United States Patent [19]

Ehrat et al.

[11] Patent Number: 5,022,208
[45] Date of Patent: Jun. 11, 1991

[54] BUTT JOINTS FOR PANELS AND/OR SECTIONS

[75] Inventors: Rainer Ehrat, Schaffhausen; Urs Deubelbeiss, Windisch; Willy Kölliker, Hägendorf, all of Switzerland

[73] Assignee: Swiss Aluminium Ltd., Chippis, Switzerland

[21] Appl. No.: 406,782

[22] Filed: Sep. 13, 1989

[30] Foreign Application Priority Data

Sep. 19, 1988 [CH] Switzerland ............... 3488/88
Mar. 23, 1989 [CH] Switzerland ............... 1090/88

[51] Int. Cl.⁵ ............................... E04C 3/30
[52] U.S. Cl. ........................... 52/586; 52/417
[58] Field of Search ............ 52/586, 417, 233, 584

[56] References Cited

U.S. PATENT DOCUMENTS

| | | | |
|---|---|---|---|
| 1,743,492 | 1/1930 | Sipe | 52/586 X |
| 3,160,249 | 12/1964 | Pavlecka | 52/586 |
| 3,251,912 | 5/1966 | Fish | 52/417 X |
| 3,641,730 | 2/1972 | Meckstroth | 52/586 X |

Primary Examiner—David A. Scherbel
Assistant Examiner—Linda J. Watson
Attorney, Agent, or Firm—Bachman & LaPointe

[57] ABSTRACT

A butt joint employing a connecting element (3). The connecting element (3) is situated in a space formed by grooves (14,24) running along the abutting ends (40,42) of the panels (1,2) and/or sections (1a,2a). There are two expansion sections (31,32) with at least one interposed spring element (33), said sections (31,32) being displaceable in the direction of the surfaces (122,132,222,232) of the outer components of the panels (1,2) or sections (1a,2a) to which the expansion sections (31,32) can be adhesively bonded. These sections (31,32) have means for releaseable interlocking via tensed spring element/elements (33), and are such that the tensed, interlocked expansion sections (31,32) can be introduced with room for play in the grooves (14,24). The surfaces of the butt joints appear to have no interuption. The application lies in vehicle manufacture, architecture and civil engineering.

14 Claims, 6 Drawing Sheets

BUTT JOINTS FOR PANELS AND/OR SECTIONS

BACKGROUND OF THE INVENTION

The invention relates to a butt joint for panels and/or sections employing a connecting element. The invention relates, furthermore, to the use of the butt joint.

Panels and/or sections are for example employed in vehicle bodies, cladding, parapets, doors and for similar building or vehicle oriented purposes. For butt joints on large area units, strips or other connecting elements are placed on the outer surfaces thereof, for example, correcting elements made of metal, plastic or wood The connecting elements in each case cover over, at least in part, the edges of two panels or sections and are usually bolted or adhesively bonded to these. The term panels as used in the instant specification means and in the following, monolithic panels such as wooden planks and multi-layer laminate panels, in particular large area panels having outer metallic layers bonded to a core layer, also sections, extruded sections, in particular of aluminum or an aluminum alloy, injection molded sections and composite sections.

Although such butt joints can be made mechanically very stable and satisfactory as far as load-bearing is concerned, they suffer the significant disadvantage that they do not enable one to obtain these large uniform areas of at least two panels or sections without a stepped transition. The butt-joint is always emphasized and obvious to the naked eye. It is therefore not possible to provide a surface of uniform appearance for example by filling-in and painting-over the transition between panels or sections. Such uniform surfaces are, however, increasingly demanded by constructors. In view of the above, the objective of the present invention is to provide butt joint of the type discussed hereinabove such that the joint between two abutting panels and/or sections is not visually emphasized, and the said panels and/or sections are usable, if desired after subsequent treatment for example by filling and painting, to create a uniform surface on at least one side without unattractive interruption by strips or other external connecting aids.

SUMMARY OF THE INVENTION

The objective is achieved by way of the invention in that the connecting element is positioned in a space formed by two grooves running along the abutting ends of the panels and/or sections and comprises two expansion sections that can be displaced in the direction of the roof surfaces of the grooves by means of at least one intervening spring element and can be adhesively bonded to the corresponding walls of the grooves, said expansion sections being flat on the outside and featuring means for releasable locking via tensed spring element or elements and the expansion section being capable of being introduced, with room for play, into the space formed by the grooves and unlocked there.

The grooves cut out of the abutting end of the panels and/or sections usefully run parallel to the outer surfaces and are preferably rectangular or square in cross-section.

A spring element for the expansion sections must on the one hand be able to be pressed together in such a manner that the connecting element can be introduced with room for play into the space formed by the grooves, or can be introduced in a slightly inclined manner. On the other hand the spring element on freeing the lock and releasing the spring action must press the expansion sections of the connecting element against the sidewalls of the groove to an extent that is sufficient to ensure that proper adhesive bonding takes place.

It is non-essential whether and in which way a mechanical or pneumatic spring-loading force is stored on interlocking the connecting sections. In all cases, however, it is preferable to ensure that the spring element or elements provide the resultant action uniformly over the whole length and breadth of the connecting element.

Particularly suitable are spring elements of an elastic block of plastic which are situated between the expansion sections, extend the whole length of the connecting element and ensure the above mentioned uniform action. This comprises, usefully, a foam in particular a closed-pore soft foam.

Further, the spring element can advantageously be of an elastic sleeve that is situated between the expansion sections and can contain a positive pressure. Also with this solution the action of the spring element is automatically distributed uniformly along the whole length of the connecting element.

Also possible of course is a plurality of spring elements in the form of spiral, leaf or plate springs or rubber cushions situated between the expansion sections.

In order to secure the expansion sections of the connecting element before it is introduced into the space formed by the grooves, an adhesive of the conventional type employed for construction work is applied over the whole area, in strips or at a series of points on the inside of the groove and/or on the outside of the expansion sections. The force applied by the spring element after unlocking is sufficient to press together the surfaces that have to be bonded to each other, and for a sufficient interval of time to allow the adhesive to harden. Thereafter, the action of the spring unit is no longer necessary although it continues to be present. The two separated expansion sections provide the butt joint with adequate mechanical strength. Full-area-coverage of adhesive also prevents harmful media from penetrating the joint.

The outer layers of laminate panels and sections and extruded sections are preferably of metal, in particular aluminum or an aluminum alloy, or of plastic such as for example polyethylene, polypropylene, polyvinylchloride or polyesters. The core layer or layers of laminate panels and sections are for example of a rigid, foamed or monolithic plastic or wood, possibly with fire retarding additives.

The use of the butt joint with large area panels and/or sections on at least one side serves, according to experience, for the production of surfaces free of steps and having a uniform appearance in applications involving vehicle manufacture, architecture and civil engineering. The invention is of particular significance in car body-work and cladding.

The panels and/or sections joined in the manner according to the invention allow the whole surface to have the appearance of being free of joints. If a surface is required also to have the appearance of uniformity when viewed close-up, then the gaps can be filled and painted over so that also large areas have an appearance of uniformity.

BRIEF DESCRIPTION OF THE DRAWINGS

The invention is described in greater detail in the following description with the aid of exemplified embodiments that are shown in the drawings also the subject of dependent claims viz., FIG. 1 Two multi-layer laminate panels prepared as a butt joint having grooves extending to the outer layers.

DETAILED DESCRIPTION

Figure 1:
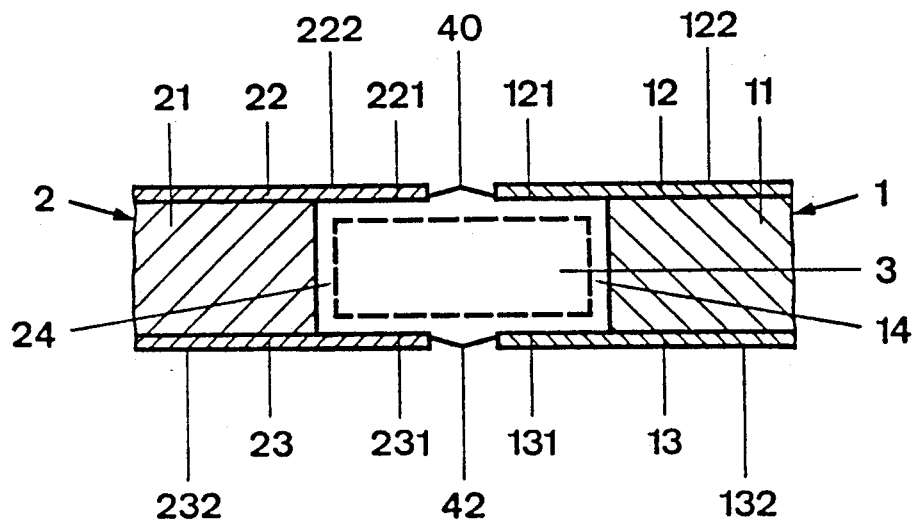

The multi-layer laminate panels 1, 2 shown in FIG. 1 feature at each of their end faces a groove 14, 24, square in cross-section and featuring in the direction of the outer layers 12, 13, 22, 23 made of an aluminum alloy, corresponding walls with inner faces 121, 131, 221 and 231. These outer layers are bonded in a conventional manner to core layers 11, 21 made for example of polyethylene. The abutting faces 40, 42 are exclusively the end faces of the outer layers.

The outer layers 12, 13, 22, 23 have outer faces 122, 132, 222, 232.

Indicated by a broken line in the space formed by the grooves 14, 24 is a connecting element 3. It is clearly seen that the tensed connecting element 3 only partly fills the space, exhibits room for play with respect to the outer layers 12, 13, 22, 23 and can be tilted.

Figure 2:
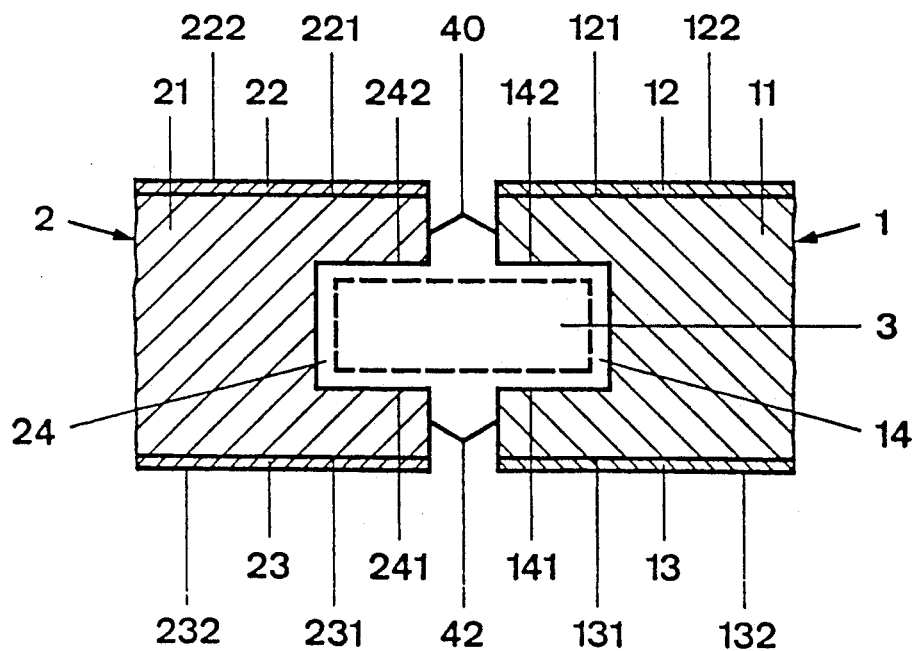
FIG. 2 Two multi-layer laminate panels prepared as a butt joint having grooves in the core layer.

In the version shown in FIG. 2 the core layers 11, 21 are of a rigid plastic foam, for example polyurethane with fire retarding additives, and are therefore somewhat thicker in comparison with those in FIG. 1. In contrast to FIG. 1 the grooves 14, 24 are exclusively in the core material. The end faces of the multi-layer laminate panels 1, 2 i.e. the abutting faces 40, 42, are made up of outer layer material and core material.

On bringing the abutting ends 40, 42 together and partly relaxing the connecting element 3, the latter presses against the walls 141, 142, 241 and 242 of the grooves 14, 24.

According to a version not shown here the grooves 14, 24 can also be created away from the middle of the laminate panels 1, 2. Furthermore, the laminate panel can in principle as in FIG. 2 be replaced by a monolithic panel e.g. a wooden plank.

Figure 3:
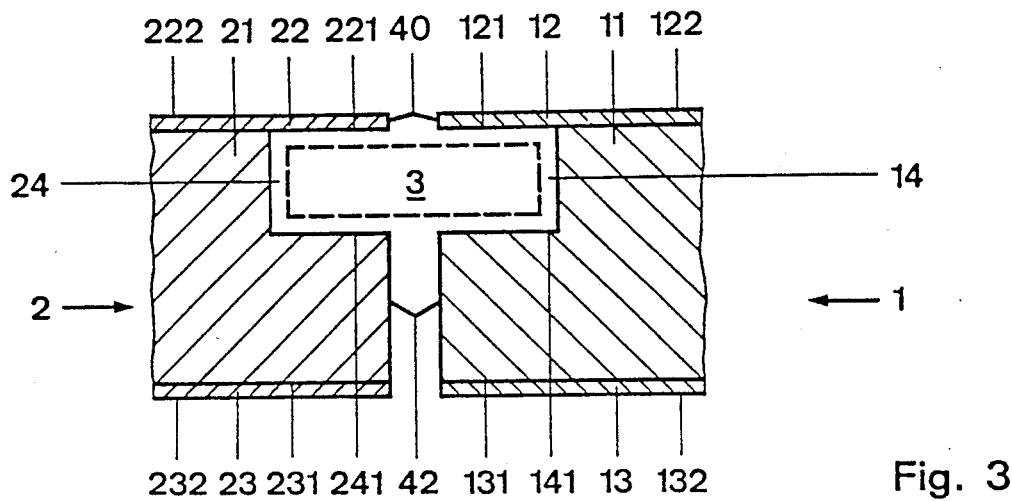
FIG. 3 Two multi-layer laminate panels prepared as a butt joint having non-symmetrical grooves.

FIG. 3, essentially a combination of FIGS. 1 and 2, shows laminate panels 1 and 2 with grooves 14, 24 which are delimited in the direction of the outer layer surfaces 122, 132, 222, 232 on the one side by the inner faces 121, 221 of outer layers 12, 22 respectively on the other side by sidewall faces 141, 241 of core material. On relaxing the connecting element the same presses on the sidewalls of the groove 14, 24 made up of various materials. According to another version of FIG. 3 the outer layers 13, 23 can be omitted.

Figure 4:
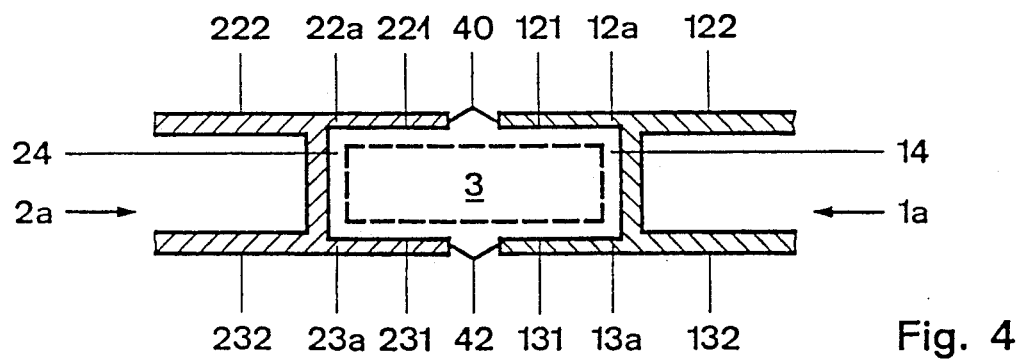
FIG. 4 Two extruded sections prepared for butt joint connection.

In FIG. 4 two sections 1a, 2a, for example extruded sections of an aluminum alloy or injection molded sections of polyethylene have been prepared to form a butt joint. The abutting faces 40, 42 are the end faces of section flanges 12a, 13a, 22a, 23a which at the same time form the outer faces 122, 132, 222, 232 while the inner faces 121, 131, 221, 231 form the grooves 14, 24. The sections 1a, 2a are joined in a manner analogous to the joining of laminate panels 1, 2 by means of a tensed connecting element 3 indicated here by a broken line.

Figure 5:
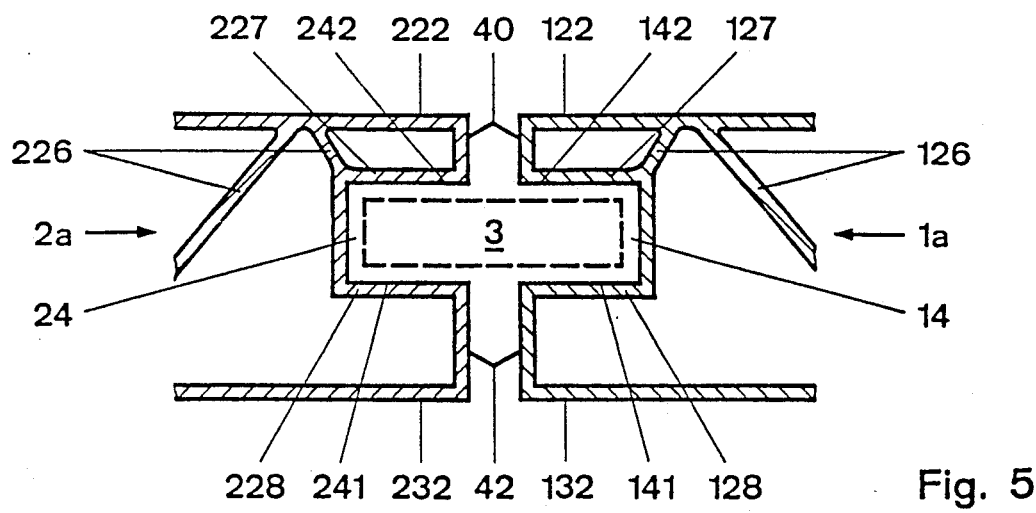
FIG. 5 Another version of FIG. 4.

The sections 1a, 2a shown in FIG. 5 are of complicated cross-section and feature strengthening struts 126, 226. The inner faces 141, 142, 241, 242 of section flanges 127, 128, 227, 228 delimiting the grooves 14, 24 at the sides serve as the contact faces for the connecting element 3 which is introduced tensed then subsequently relaxed and expanded in the direction of the outer faces 122, 132, 222, 232. The grooves 14, 24 can of course also be situated in the middle region.

The softer the material of the core layers 11, 21 the more FIG. 1 or FIG. 3 is preferred to FIG. 2 as in the first case the partly relaxed connecting element 3 rests against, and is bonded to, four or two outer layers 12, 13, 22, 23, which effects a more precise butt joint with higher mechanical strength. The butt joint can have a panel on one side and a section on the other.

Figure 6:
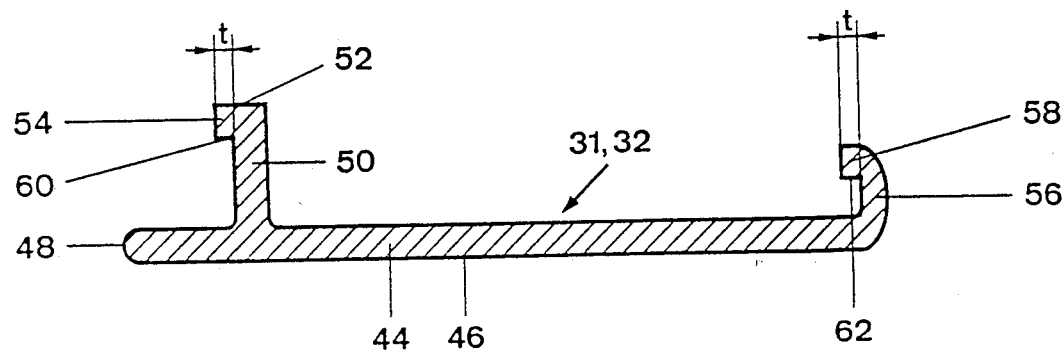
FIG. 6 An expansion section of a first version of a connecting element.

FIG. 6 shows identical expansion sections 31, 32 of a first version of a connecting element that can be inserted in the grooves 14, 24 (FIGS. 1-5). The expansion sections 31, 32 comprise essentially of a base plate 44 with a flat outer surface 46. Projecting vertically out of the side opposite side 46 thereof and close to the edge 48 is a first longitudinal strut 50 at the end 52 of which is a first undercut hook-like strip 54, forming an undercut surface 60 of width t.

At the other end of the base plate 44 is a second longitudinal strut 56 which in the present case is in the form of a curved part. This part forms a second hook-like strip 58 which again has an undercut surface 62 of width t. According to a version not shown here the second longitudinal strut 56 can have the same height as the first. The hook-like strips 54, 58 on the same side and with undercut surfaces 60, 62, form interlocking grooves.

The length of the side edge 48 must be greater than the whole width of the second longitudinal strut in the direction of the base plate 44.

Figure 7:
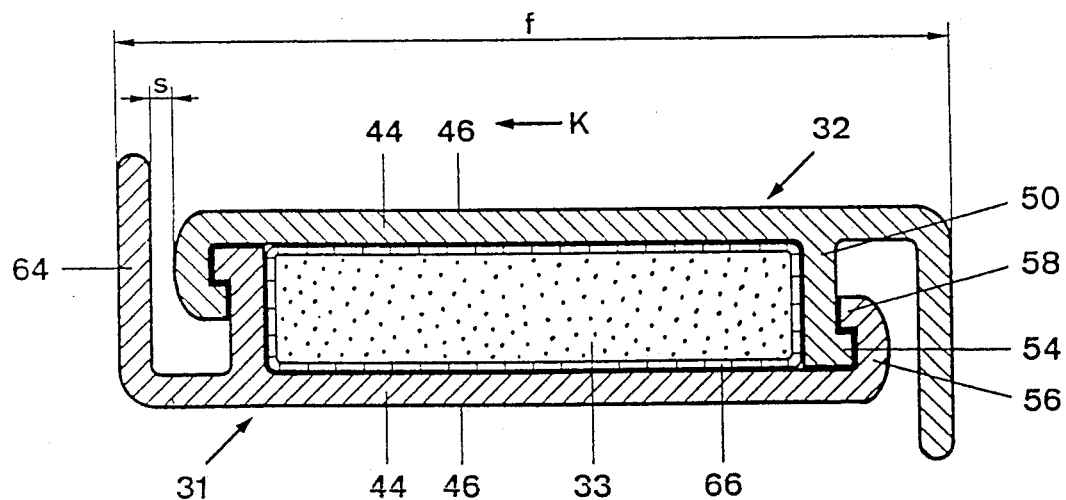
FIG. 7 Two interlocking expansions sections of the first version of a connecting element, with tensed spring element.

Shown in FIG. 7 are two interlocked expansion sections 31, 32, which feature, however, two shorter essentially L-shaped flanges 64 not present in FIG. 6. These shorter flanges 64 which clearly project beyond the first taller strut 50 are projections of the longer flange of the base plate.

One hook-like strip 54 of each of the first longitudinal strut 50 and a hook-like strip 56 of the bent-over, lower longitudinal strut 56 are interlocked via the undercut surfaces 60, 62.

The distance s of the bent-over, lower longitudinal strut 56 of the one expansion section from the shorter flange 64 of the other expansion section is slightly greater than the length t of the undercut surface 60, 62 of the hook-like strip 54, 58. If for example one expansion section 31 is fixed and a force K applied to the other expansion section 32 in the direction shown, then the expansion section 32 is pushed in such a way that the said undercut surfaces 60, 62 no longer lie against each other but beside each other.

The spring element 33 comprises an elastic sleeve 66 which rests against the expansion sections 31, 32 or on the first longitudinal strut 50 and contains a gaseous medium, usefully air, under pressure. The pressure of the gas in the sleeve 66 is usually two to three times the normal pressure, depending on the amount of play for the connecting element in the grooves 14, 24 (FIGS. 1-5).

If by the application of a force K, expansion section 32 is pushed relative to expansion section 31, then the expansion section 32 can unlock. The elastic sleeve 66 expands until equilibrium is reached or the expansion sections 31, 32 meet with resistance.

Figure 8:
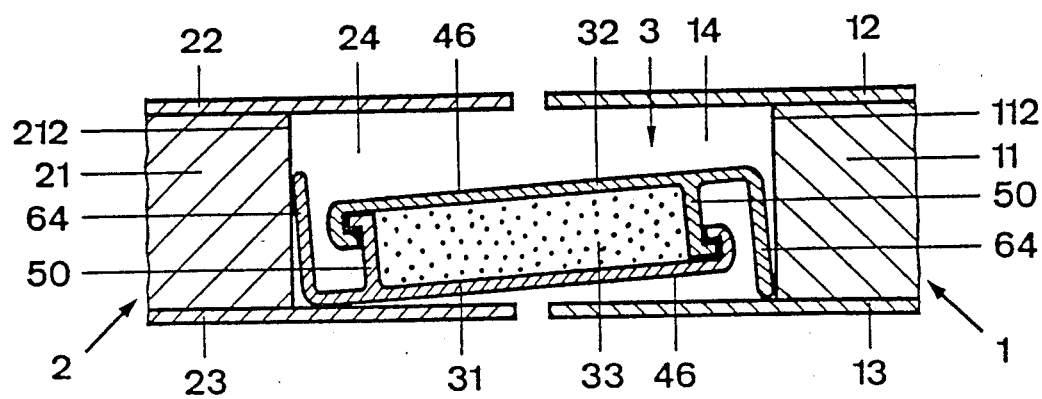
FIG. 8 A connecting element, corresponding essentially to that in FIG. 7, in a groove as shown in FIG. 1.

FIG. 8 shows two multi-layer laminate panels 1, 2 prepared for a butt joint, each featuring a groove 14, 24 such that the core layers 11, 21 have been removed completely in the region of the grooves, as in FIG. 1.

A connecting element 3 has been introduced into the grooves 14, 24 and at least in the direction vertical to the outer layers 12, 13, 22, 23 has considerable room for play. It is evident that the grooves 14, 24 can also be shaped as shown in FIGS. 2-5.

The connecting element 3 comprises two interlocked expansion sections 31, 32 as shown in detail in FIG. 7. The spring element 33 comprises a compressed block of rubber, a closed pore soft foam plastic, extending in the longitudinal direction of the connecting element 3.

The two shorter flanges 64, of expansion sections 31, 32 lie against the end faces 112, 212 of the core layers 11, 21.

It can also be seen from FIG. 8 why it is advantageous to have the shorter flanges 64 longer then the first longitudinal flange 50. As a result of that the outer surface 46 of the expansion section 31, 32 cannot rest on an outer layer 12, 13, 22, 23. If it did, it would cause adhesive on the outer surfaces 46 and/or the inner faces of the outer layers 12, 13, 22, 23 to be pushed out as the connecting element 3 is inserted.

Figure 9:
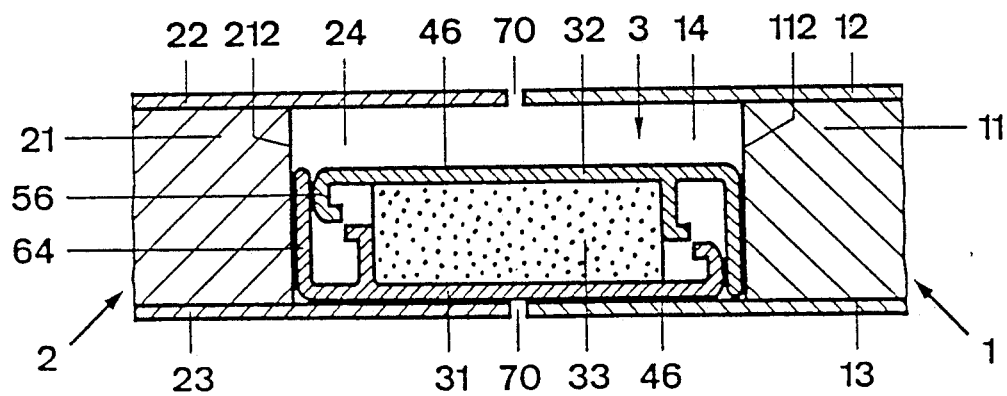
FIG. 9 The connecting element according to FIG. 8 immediately after disconnection of the interlocking expansion sections.

In FIG. 9 both of the multi-layer laminate panels 1, 2 have been pushed in the direction parallel to the outer layers 12, 13, 22, 23 at least the distance t (FIG. 6) corresponding to the dimension of the undercut surfaces of the hook-like strips 54, 58. The expansion sections 31, 32 have just become unlocked and section 31 has fallen onto outer layers 13, 23. The spring element 33 has started to push expansion section 32 towards the outer layers 12, 22. The gaps 70 between the outer layers 12, 22 and 13, 23 are not yet completely closed as the second, lower longitudinal strut 56 is pressing against the shorter flange 64.

With this version the locking mechanism is unlocked automatically and without any special effort when the two multi-layer laminate panels 1, 2 containing the connecting element 3 at the end are pushed together by applying a small force.

Figure 10:
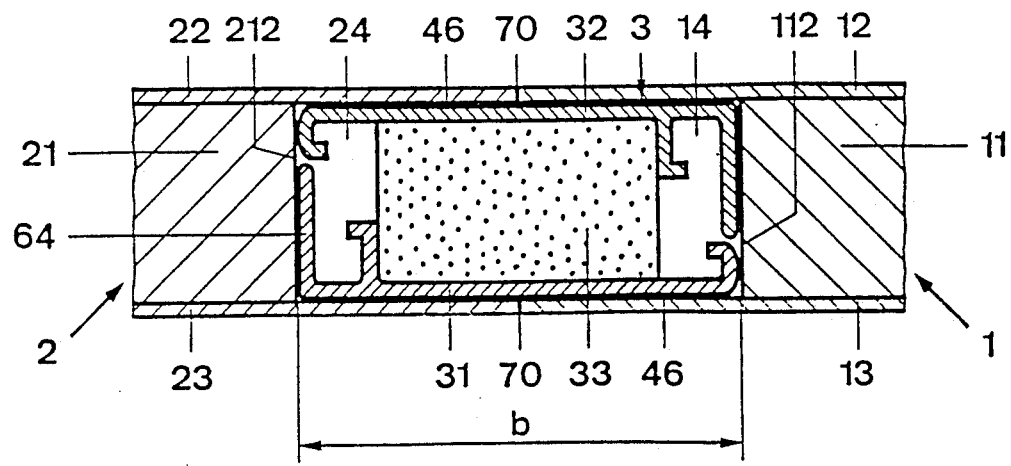
FIG. 10 The complete butt joint with flush-lying expansion sections of the connecting element.

In the representation according to FIG. 10 the spring element 33 has pushed the expansion section 32 until it presses against the outer layers 12, 22. The multi-layer laminate panels 1, 2 are then able to be pushed together completely so that the gaps 70 are completely closed. As all outer layers 12, 13, 22, 23 lie on the flat plane 46 of a laminate section 31, 32, the transition from one outer layer to the other is at the same level. For that reason it is hardly possible to observe the closed gaps 70.

The spring element 33 presses the expansion sections 31, 32 against the outer layers 12, 13, 22, 23 and enables stabilized curing of the adhesive. When the adhesive has completely set the butt joint is not only hardly visible but is also mechanically stable and protected from harmful external effects.

The dimension b of the end pieces 112, 212 of the core layers 11, 21, in the case of abutting outer layers 12, 13, 22, 23 without gap, is between the length f of the interlocked expansion sections 31, 32 (FIG. 7) less the width t of the undercut surfaces 60, 62, and the length of an extension section 31, 32. Any parts of the hook-like strips 54, 58 projecting beyond the width t are added to the distance t to be deducted. The ends 112, 212 are also the base surfaces of the grooves 14, 24.

According to a version not shown here the shorter flange 64 of the extension sections 31, 32 is sufficiently long that the second longitudinal struts 56 also in the final position rest on the shorter flange 64. In that case the minimum distance b between the core layers 11, 21 is correspondingly larger. The length of the shorter flange 64 is limited by the distance between the outer layers 12, 13 and 22, 23.

Figure 11:
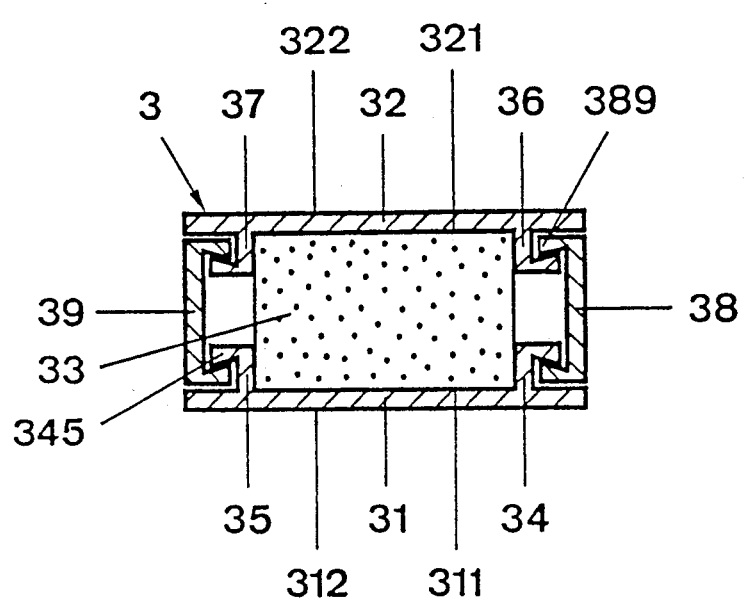
FIG. 11 A second version of a connecting element.

A second version of the connecting element 3 shown in FIG. 11 comprises two extension sections 31, 32 with interposed spring element 33, such that the extension sections 31, 32 are arranged symmetrical with respect to each other, each featuring on the side facing the spring element 33 and on both sides of the same, two hook-like strips 34,35;36,37. Each pair of hook-like strips 34, 36 and 35, 37 are clamped onto clamping sections 38 and 39 respectively in such a manner that the spring element 33 is tensed and, with respect to the position without clamping, a reduction in distance is created.

On the outer surfaces 312, 322 of the extension sections 31, 32 an adhesive is deposited, preferably at a plurality of points, and the tensed connecting element introduced with room for play in a groove 14, 24 (FIGS. 1-5). On freeing the locking mechanism after introducing the connecting element 3 into the grooves 14, 24, the extension sections 31, 32 are pressed onto the corresponding surfaces 121, 131, 221, 231 and 141, 142, 241, 242 of grooves 14, 24 by releasing the spring element 33, and bonding to these then takes place.

Figures 12, 13:
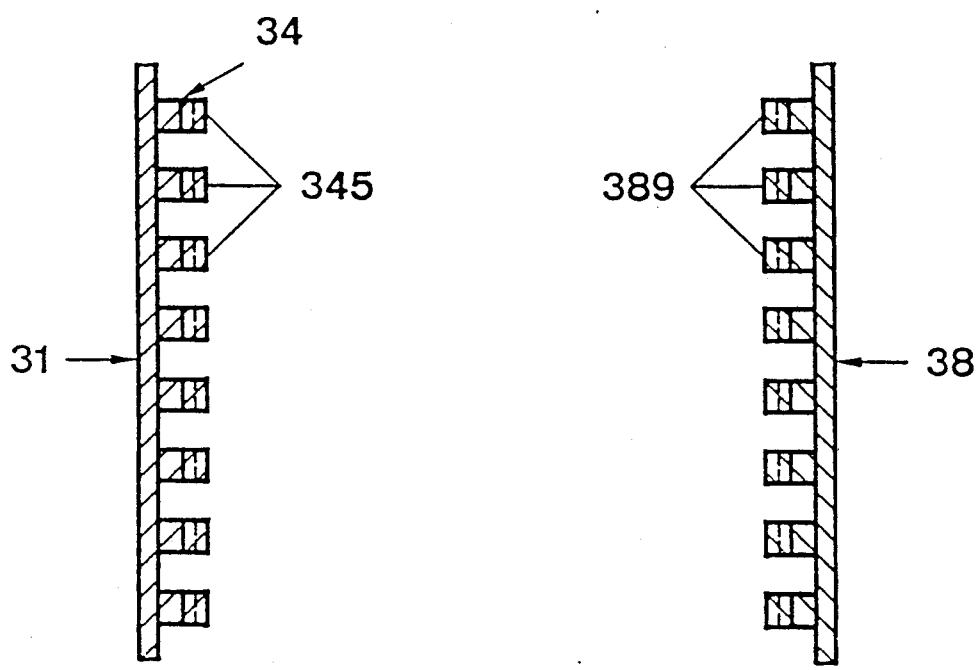
FIG. 12 A side-view of a sectioned expansion section.
FIG. 13 A side-view of a sectioned clamping section.
Figure 14:
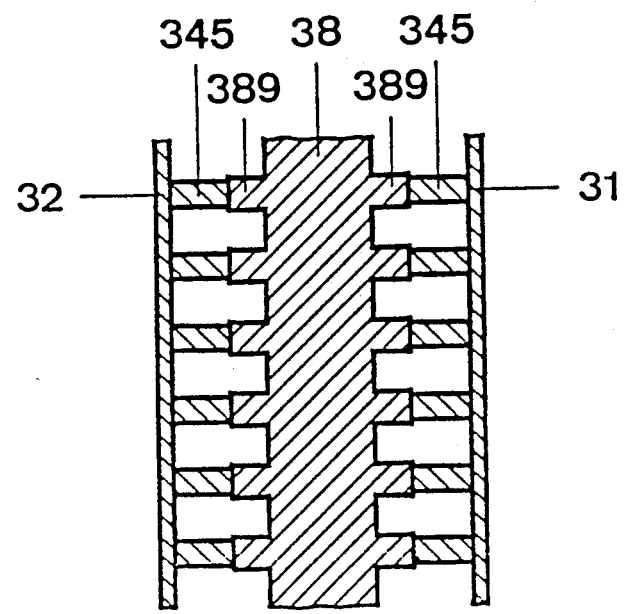
FIG. 14 A connecting element as in FIG. 11, clamped together.
Figure 15:
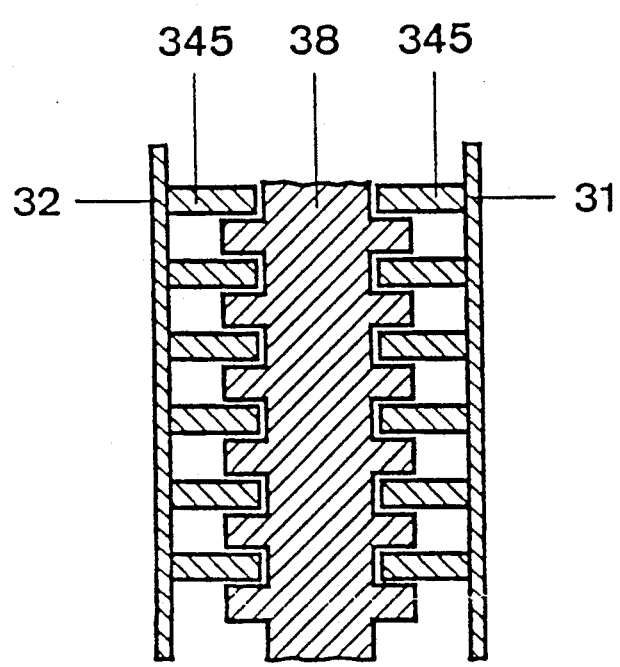
FIG. 15 A connecting element as in FIG. 11, not clamped together.

The hook-shaped strips 34, 35, 36, 37 of the expansion sections 31, 32 and the clamping sections 38, 39 are, as shown in FIGS. 12 and 13, provided with comb-like teeth 345, 389. The interlocking is achieved by putting the hook-like strips 34, 35, 36, 37 and the clamping sections 38, 39 in such a position that the teeth 345, 389 engage (FIG. 14). To unlock these after introducing the connecting element 3 into the grooves 14, 24, a force can be applied for example in the form of a blow on the clamping sections 38, 39 causing the hook-like strips 34, 35, 36, 37 and the clamping sections to be displaced with respect to one another in such a way that the teeth 389 of the clamping sections 38, 39 come to rest in the gaps in the hook-like strips 34, 35, 36, 37 i.e. between the teeth 345, after which as a result of the stored energy in the spring element 33 there can be an increase in the distance between the expansion sections 31, 32 (FIG. 15).

The expansion sections 31, 32 are preferably of metal and the clamping sections 38, 39 of plastic. In another preferred version the expansion sections 31, 32 are of the same metal as the outer layers 12, 13; 22, 33 of the laminate sections 1, 2 or sections 1a, 2a, in particular aluminum or an aluminum alloy.

What is claimed is:

1. Butt joint for panels which comprises: two panels having abutting ends and panel surfaces; grooves in said panels having a space therein running along the abutting ends and having groove walls; a connecting element in said space comprising tensed, interlocking expansion sections having a flat outside surface and wherein the tensed interlocking expansion sections can be introduced into said grooves with room for play, wherein said expansion sections can be displaced towards the panel surfaces and adhesively bonded to the corresponding groove walls, said connecting element including at least one releasable, tensed spring element between said expansion sections and operative to displace the interlocking expansion sections towards said panel surfaces to provide a butt joint having a uniform external appearance.

2. Butt joint according to claim 1 wherein said panels are extruded sections.

3. Butt joint according to claim 1 wherein the spring element applies its action uniformly over the whole length of the connection element.

4. Butt joint according to claim 1 wherein the spring element comprises an elastic block of plastic positioned between the expansion sections and running the full length of the connecting element.

5. Butt joint according to claim 4 wherein the plastic block is comprised of a foam.

6. Butt joint according to claim 5 wherein said foam is a closed-pore, soft foam.

7. Butt joint according to claim 1 wherein the spring element comprises an elastic sleeve positioned between the expansion sections, filled with a gaseous medium at positive pressure, and extends the whole length of the connecting element.

8. Butt joint according to claim 7 wherein said sleeve is filled with air.

9. Butt joint according to claim 1 wherein the expansion sections of the connecting element comprise essentially a base plate with longitudinal struts at each end projecting out on the same side of the plate, said struts having in the region of their ends undercut surfaces formed by a hook-like strip, and two interlocked expansion sections with tensed spring element have an overall width (f) that is greater at least by the width (t) of the undercut surfaces than the distance (b) of the base areas of the grooves when the outer layers are touching, and the length of an extension section at most corresponds to that of said distance (b).

10. Butt joint according to claim 9 wherein, in order to produce automatic unlocking, two interlocked expansion sections with tensed spring element have an overall width (f) which is larger at least by the width (t) of the undercut surfaces than the dimension (b) of the base surfaces of grooves when the outer layers are touching, and the length of an expansion section at most corresponds to the dimension (b) mentioned.

11. Butt joint according to claim 9 wherein the longitudinal struts projecting at a right angle from the base plate are of different heights and the lower longitudinal strut is a bent-over or angled end of the base plate.

12. Butt joint according to claim 9 wherein the expansion sections of the connecting element are essentially L-shaped, the longer flange forming the base plate and the shorter flange is longer than the first longitudinal strut but shorter than the distance between the walls of the grooves.

13. Butt joint according to claim 1 having flat, step-free surfaces of uniform appearance at least on one side thereof.

14. Butt joint according to claim 1 wherein said panel is a multi-layer laminate and wherein the grooves at the abutting ends of the multi-layer laminate panel are rectangular or square in cross-section.

* * * * *